United States Patent Office 3,530,135
Patented Sept. 22, 1970

3,530,135
ACYLATED DIBENZO NAPHTHACRIDINE-5,11,16-TRIONES
Arnold Wick, Therwil, Switzerland, assignor to Ciba Limited, Basel, Switzerland, a Swiss company
No Drawing. Filed June 13, 1967, Ser. No. 645,597
Claims priority, application Switzerland, June 14, 1966, 8,568/66
Int. Cl. C07d 37/00
U.S. Cl. 260—274                                    7 Claims

ABSTRACT OF THE DISCLOSURE

This invention relates to dyestuffs of the formula

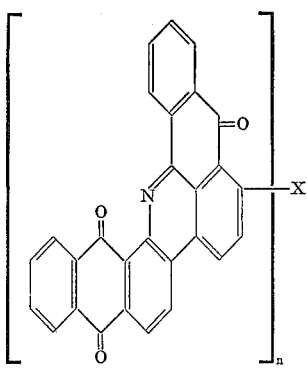

wherein X is a mono- or diamido group bound at the nitrogen and $n$ is 1 or 2.

---

The present invention provides new colourants which may be used as pigments, and some of which may also be used as vat dyestuffs.

The new colourants are dibenzonaphthacridine-5,11,16-triones containing an acylamino group in 6-position, the most valuable colourants of the series being mainly those corresponding to the formula

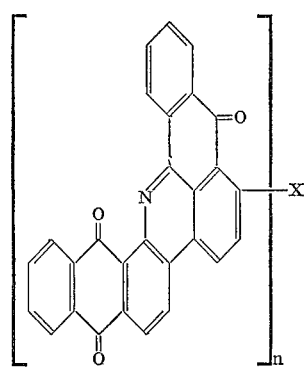

in which X represents an acylamino group bound through its nitrogen atom and $n=1$ or 2. When $n$ stands for 2, X is thus a divalent diamide residue, the two amide nitrogen atoms of which each carries a chromophore of the formula indicated. When $n$ stands for 1, only one chromophore of the formula indicated is present in the molecule.

The new colourants may be obtained by condensing with an acylating agent a dibenzonaphthacridine-5,11,16-trione, which contains an acylatable amino group, preferably a primary amino group, in 6-position. For example, a 6-amino-dibenzonaphthacridine-5,11,16-trione, which corresponds, for example, to the formula

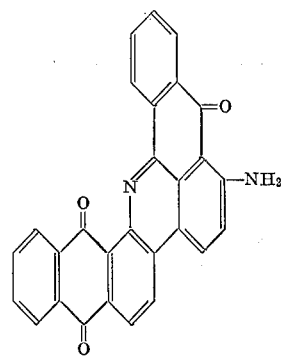

may be acylated at the amino group by means of anhydrides or halides of monobasic or polybasic acids this compound is prepared as shown by "chimia," vol. 20, 1966 page 126.

Suitable acylating agents are the anhydrides and halides, especially the chlorides or bromides, of aliphatic, araliphatic, cycloaliphatic, aromatic or heterocyclic monocarboxylic or polycarboxylic acids, for example, acetic anhydride, acetyl chloride, sulphochloroaceict acid chloride, propionyl chloride, butyryl chloride, lauryl chloride, acrylic acid chloride, hexahydrobenzoyl chloride, phenylacetyl chloride, cinnamic acid chloride, β-chloropropionyl chloride, α,β-dibromo- or dichloropropionic acid bromide or -chloride, α-bromacrylic acid bromide, benzoyl chloride, ortho-fluoro- or ortho-chloro-benzoyl chloride, parachlorobenzoyl chloride, 2,4-dichlorobenzoyl chloride, ortho-, meta- or para-methoxybenozyl chloride, sulphobenzoyl chlorides, para-nitrobenzoyl chloride, α- or β-naphthoyl chloride, diphenyl-4-carboxylic acid chloride, furan-2-carboxylic acid chloride, thiophene-2-carboxylic acid chloride, 5-carbomethoxythiophene-2-carboxylic acid chloride and 2-phenylthiophene-5-carboxylic acid chloride, thiazolecarboxylic acid halides, especially 2-phenylthiazole-4-carboxylic acid chloride, triazolecarboxylic acid halides, for example, 1-phenyl-1,2,3-triazole-4-carboxylic acid chloride, 2-chlorobenzthiazolecarboxylic acid chlorides, anthraquinone carboxylic acid chlorides, 1-aminoanthraquinone-2-carboxylic acid chloride, 1,9-thiazoleanthrone-2-carboxylic acid, 1,9-anthrapyrimidine-2-carboxylic acid, oxalyl chloride, glutaric acid dichloride, the dichlorides of fumaric acid, succinic acid, isophthalic acid, terephthalic acid, naphthalenedicarboxylic acids, azodiphenyldicarboxylic acids, 2,5-dimethoxyterephthalic acid, fluoranthenedicarboxylic acids, stilbene dicarboxylic acids and diphenyldicarboxylic acids, those of the formulae

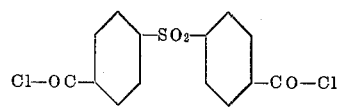

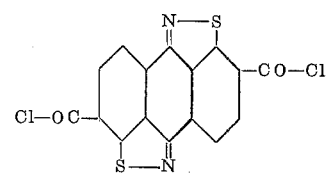

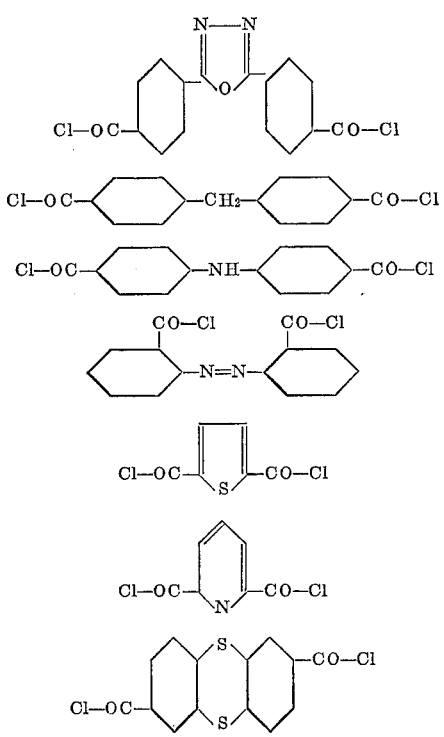

and chloroformic acid esters, for example, chloroformic acid methyl ester or chloroformic acid ethyl ester.

Acylating agents that are also suitable are those which contain at least one sulphonic acid group or a group that can be hydrolysed to such a group, for example, the halides of sulphonecarboxylic acid, especially sulphobenzenecarboxylic acid chlorides and, in particular, the sulphochlorides of benzenecarboxylic acids. Also suitable are disulphobenzenecarboxylic acid chlorides, sulphofuran- and sulphothiophenecarboxylic acid halides, sulphonaphthalenecarboxylic acid halides and the like, as well as internal anhydrides of ortho-carboxybenzenesulphonic acids.

The reaction between the aminonaphthacridinetriones and the acylating agents in accordance with the invention may be carried out in an inert organic solvent, for example, nitrobenzene, chlorobenzene or ortho-dichlorobenzene, if necessary, in the presence of an agent capable of binding acid, for example, pyridine, or also in the presence of formamide or dimethylformamide as catalyst, at an elevated temperature.

After cooling the reaction mixture, the colourant obtained may be isolated by filtration.

To increase their solubility in the vat, the new 6-acylaminodibenzenonaphthacridine - 5,11,16 - triones so obtained may be subjected to sulphonation with oleum or chlorosulphonic acid.

The new colouring matters may be used in known manner for pigmenting lacquers, especially stoving lacquers, and also for pigmenting synthetic organic materials, for example, polyvinyl chloride and the like. Furthermore, those products which contain a sulphonic acid group in the acylamino residue may be used for dyeing and printing a very wide variety of fibres, especially cellulosic fibres, by vat dyeing methods. Dyeings displaying an excellent fastness to light are obtained.

The following examples illustrate the invention. Unless otherwise stated, the parts and percentages are by weight.

EXAMPLE 1

10 parts of 6-amino-5H,11H, 16H-dibenzo[c,mn] naphtho [2,3-h]acridine-5,11,16-trione of the formula

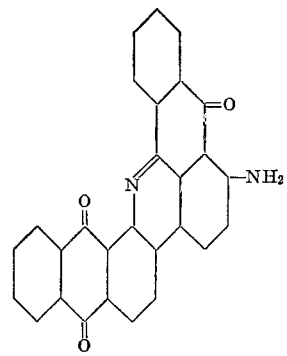

are stirred for 20 hours at 140 to 145° C. in 500 parts of dry nitrobenzene together with 12 parts of benzoyl chloride and 0.2 part of dimethylformamide. A further 6 parts of benzoyl chloride are then added and the batch is stirred for a further 3 hours at 160 to 165° C. The crystalline, yellow product of the formula

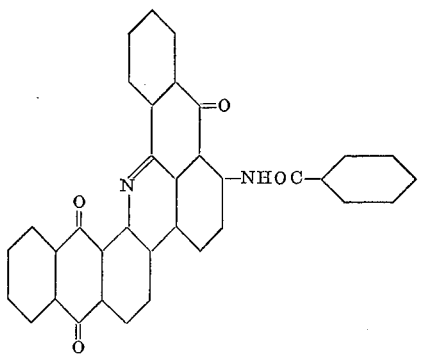

which precipitates in a good yield is isolated by suction filtration at 100° C., washed with nitrobenzene having a temperature of 100° C., then with alcohol, and dried. The sparingly soluble product dyes cotton and regenerated cellulose greenish yellow tints when applied in an alkaline hydrosulfite vat.

EXAMPLE 2

20 parts of diphenyl-4-carboxylic acid are stirred for 3 hours at 85° C. in 500 parts of dry nitrobenzene together with 13.1 parts of thionyl chloride and 0.2 part of dimethylformamide. While still warm, the solution thus obtained is added to 21.5 parts of 6-amino-5H,11H,16H - dibenzo - [c,mn]naphtho[2,3 - h]acridine 5,11,16-trione in 1,500 parts of dry nitrobenzene, which is at boiling temperature, and the batch is stirred for 1 hour under reflux. The crystalline, yellow product of the formula

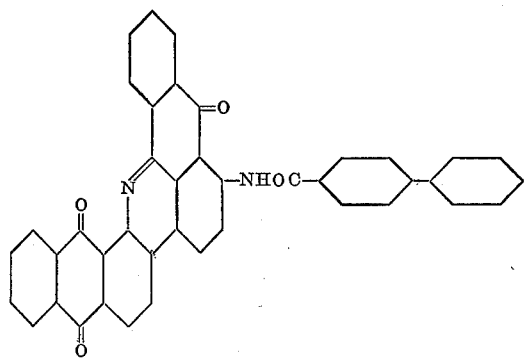

which precipitates from the hot reaction mixture in good yield is worked up in the manner described in Example 1. The product so obtained is a greenish yellow pigment possessing excellent properties of fastness.

Further pigments which are fast to light and to migration may be obtained in an analogous manner from the acids listed in the following table or the acid chlorides thereof, by condensation in accordance with the above instructions.

| No. | Acid | Condensation time in hours | Tint |
|---|---|---|---|
| 1 | Cl–⟨⟩–COOH | 6 | Greenish yellow. |
| 2 | ⟨⟩–COOH (Cl) | 4 | Do. |
| 3 | ⟨⟩–COOH (F) | 2 | Do. |
| 4 | Cl–⟨⟩–COOH (Cl) | 3 | Do. |
| 5 | CO₃–⟨⟩–COOH | 4 | Do. |
| 6 | CH₃O–⟨⟩–COOH | 4 | Do. |
| 7 | pyridine–COOH | 4 | Do. |
| 8 | anthraquinone–COOH | 2 | Do. |
| 9 | thiazole-fused anthraquinone–COOH | 2 | Greenish yellow. |
| 10 | N—NH fused anthraquinone–COOH | 2 | Yellow. |
| 11 | N=N fused anthraquinone–COOH | 2 | Do. |
| 12 | acridone–COOH | 4 | Do. |

Specially pure products may be obtained when the crude products which have been washed with nitrobenzene are boiled for a short time in fresh nitrobenzene, isolated by suction filtration at 100° C., washed with nitrobenzene and alcohol, and then extracted with warm, dilute sodium carbonate solution to remove any acid that may still be present. The product is then washed until the washings run neutral and dried.

EXAMPLE 3

17 parts of terephthalic acid are stirred for 1 hour at 80° C. and then for 1 hour at 120° C. in 500 parts of dry nitrobenzene together with 20 parts of thionyl chloride and 1 part of dimethylformamide. The excess thionyl chloride is removed from the acid chloride solution so obtained by a stream of dry air. While still warm, the solution is added dropwise over a period of 1 hour to 56 parts of 6-amino-5H,11H,16H-dibenzo[c,mn]naphtho[2,3-h]acridine-5,11,16-trione in 3,000 parts of boiling nitrobenzene and the batch is stirred for 8 hours under reflux. It is then allowed to cool to 100° C. and stirred for a further 10 hours at that temperature.

The batch is then suction filtered, the filter residue is washed with nitrobenzene having a temperature of 100° C., stirred for 30 minutes under reflux in 2,500 parts of fresh nitrobenzene, again isolated at 100° C., and washed with warm alcohol. The product moist with alcohol is boiled in 2,500 parts of 1% sodium carbonate solution, isolated by suction filtration, washed until the washings run neutral and then dried. A greenish yellow pigment of the formula

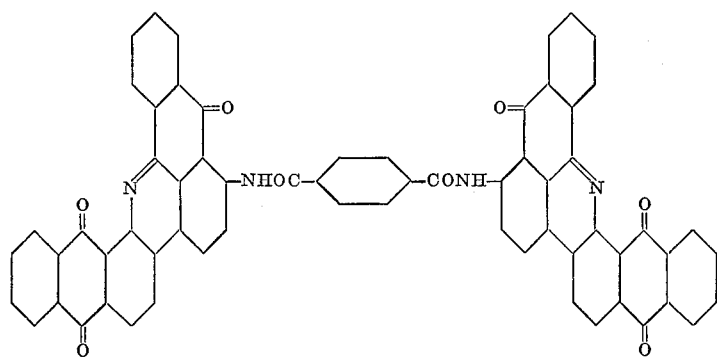

is obtained which possesses an excellent fastness to light and to migration.

The pigment of the formula

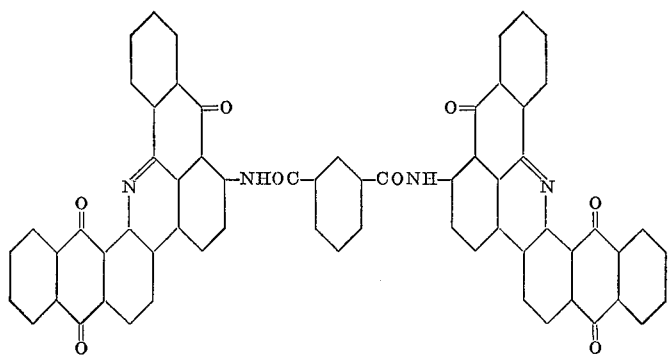

is obtained in an analogous manner by using isophthalic acid as starting material and carrying out condensation for a somewhat longer period.

Colouration procedure.—A mixture prepared from 65 parts of stabilized polyvinyl chloride, 35 parts of dioctyl phthalate and 0.2 part of the above terephthalic amide pigment this example is worked to and fro for 7 minutes on a two-roller mill at 140° C. A green-yellow film possessing a very good fastness to light and to migration is obtained.

EXAMPLE 4

18 parts of the pigment obtained in the manner described in Example 2 are stirred for 5 hours at room temperature in 200 parts of 10% oleum. The batch is then discharged on to 2,000 parts of iced water, suction filtered, and the filter residue is washed until the washings run neutral. The moist filter residue is suspended in 2,000 parts of deionized water, reduced at 40 to 45° C. by the addition of 40 parts of 40% sodium hydroxide solution and 32 parts of sodium hydrosulphite, and stirred for 30 minutes. The product is reoxidized by blowing in air, salted out by the addition of 60 parts of sodium chloride, isolated by suction filtration, washed with 3% sodium chloride solution until the washings run neutral and then dried in vacuo at 60° C. The readily vattable, water-soluble dyestuff so formed corresponds, in the form of the free acid, to the formula

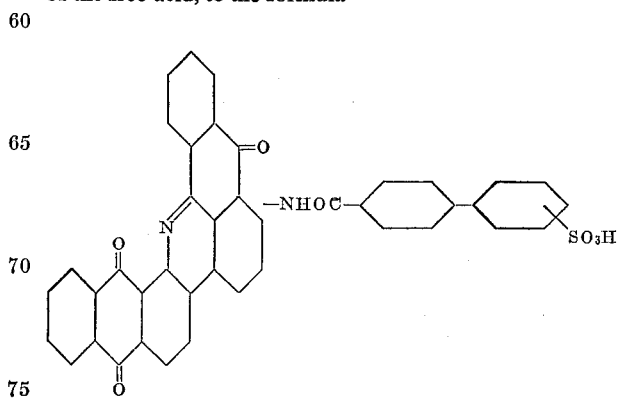

and dyes cotton and regenerated cellulose fast, greenish yellow tints when applied in an alkaline hydrosulphite vat.

What is claimed is:
1. A dyestuff of the formula

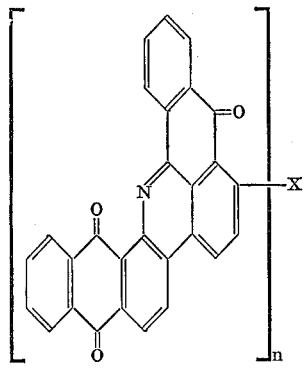

wherein X is selected from the group consisting of acetamido, sulfochloroacetamido, propionamido, butyrylamido, laurylamido, acrylamido, hexahydrobenzoylamido, phenylacetamido, cinnamamido, β-chloropropionamido, α,β-dibromopropionamido, α,β-dichloropropionamido, α-bromoacrylamido, benzoylamido, o-halobenzoylamido, 2,4-dichlorobenzoylamido, methoxybenzoylamido, sulfobenzoylamido, p-nitrobenzoylamido, α-naphthoylamido, β-naphthoylamido, diphenyl-4-carbonylamido, furan-2-carbonylamido, thiophene-2-carbonylamido, 5-carbomethoxythiophene - 2 - carbonylamido, 2-phenylthiophene-5-carbonylamido, 2-phenylthiazole - 4 - carbonylamido, 2-chlorobenzthiazolecarbonylamido, anthraquinonecarbonylamido, 1 - aminoanthraquinone - 2 - carbonylamido, 1,9 - thiazoleanthrone - 2 - carbonylamido, oxalylamido, glutardiamido, fumardiamido, succindiamido, isophthaldiamido, terephthaldiamido, naphthalenedicarbonylamido, 2,5 - dimethoxyterephthaldiamido, fluoranthenedicarbonylamido, stilbenedicarbonylamido, chloroformamido, sulfobenzenecarbonylamido, disulfobenzenecarbonylamido, sulfofurancarbonylamido, sulfothiophenecarbonylamido, sulfonaphthalenecarbonylamido,

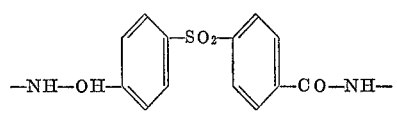

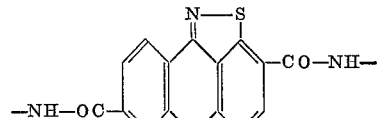

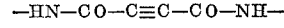

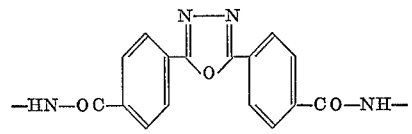

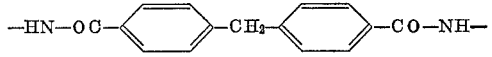

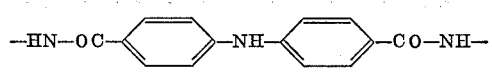

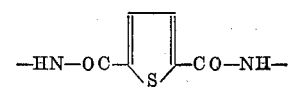

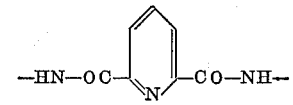

and

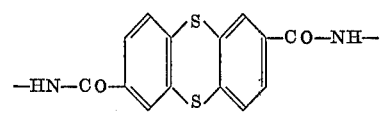

and n is 2 when X is a dicarbonyldiamido from the preceding group, otherwise n is 1.

2. A dyestuff as claimed in claim 1 wherein X is phenylacetamido, benzoylamido, o-halobenzoylamido, 2,4-dichlorobenzoylamido, methoxybenzoylamido, sulfobenzoylamido, p-nitrobenzoylamido, α-naphthoylamido, β-naphthoylamido, diphenyl - 4 - carbonylamido, anthraquinonecarbonylamido, 1 - aminoanthraquinone - 2 - carbonylamido, terephthaldiamido, naphthalenedicarbonylamido, 2,5 - dimethoxyterephthaldiamido, benzenecarbonylamido, disulfobenzenecarbonylamido, sulfonaphthalenecarbonylamido,

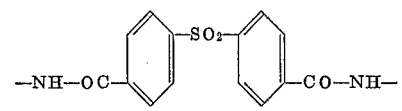

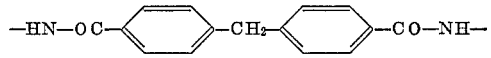

and

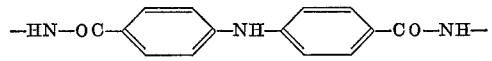

3. A dyestuff as claimed in claim 1 wherein X is an aromatic heterocyclic, selected from the group.

4. A dyestuff as claimed in claim 3 of the formula

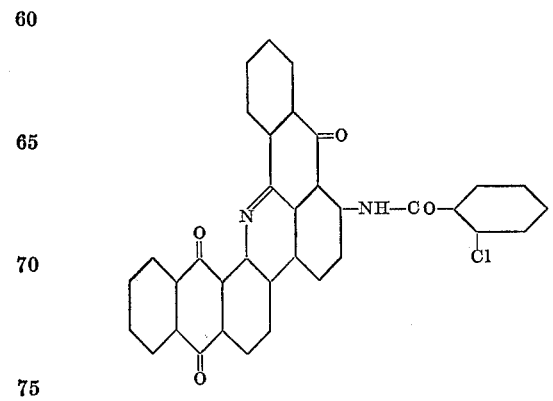

5. A dyestuff as claimed in claim 3 of the formula
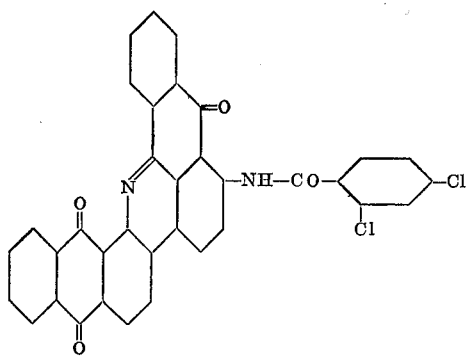
6. A dyestuff as claimed in claim 3 of the formula
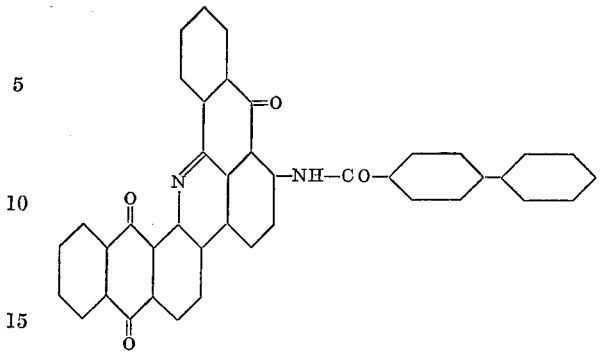
7. A dyestuff as claimed in claim 5 of the formula
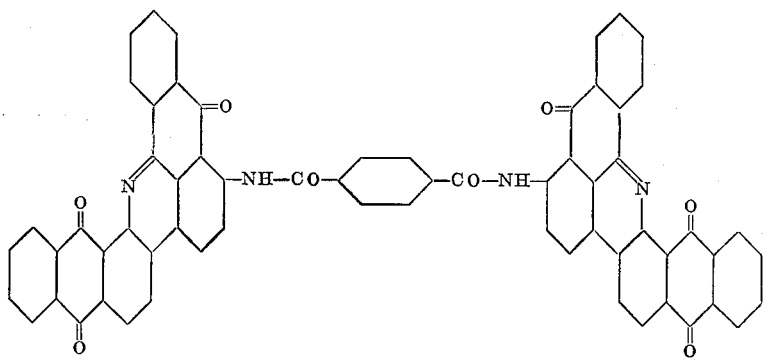
References Cited
UNITED STATES PATENTS
3,030,369   4/1962   Hardy _____ 260—274
3,274,197   9/1966   Weber _____ 260—274
DONALD G. DAUS, Primary Examiner
U.S. Cl. X.R.
8—542; 106—288; 260—205, 261, 279, 295, 302, 304, 307, 327, 332.2, 347.3, 376, 515, 544, 546, 686

PO-1050
(5/69)

UNITED STATES PATENT OFFICE
CERTIFICATE OF CORRECTION

Patent No. 3,530,135                  Dated September 22, 1970

Inventor(s) ARNOLD WICK

It is certified that error appears in the above-identified patent and that said Letters Patent are hereby corrected as shown below:

Column 9, lines 54 to 56, the left hand side of the formula should read:

—NH—OC— 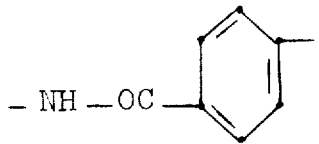

Signed and sealed this 22nd day of June 1971.

(SEAL)
Attest:

EDWARD M. FLETCHER, JR.
Attesting Officer

WILLIAM E. SCHUYLER, JR.
Commissioner of Patents